(12) United States Patent
Quioc

(10) Patent No.: US 9,051,225 B1
(45) Date of Patent: Jun. 9, 2015

(54) GAS GENERATOR

(71) Applicant: TK Holdings, Inc., Armada, MI (US)

(72) Inventor: Eduardo L. Quioc, Westland, MI (US)

(73) Assignee: TK Holdings Inc., Armada, MI (US)

( * ) Notice: Subject to any disclaimer, the term of this patent is extended or adjusted under 35 U.S.C. 154(b) by 0 days.

(21) Appl. No.: 13/792,894

(22) Filed: Mar. 11, 2013

Related U.S. Application Data

(63) Continuation-in-part of application No. 12/802,839, filed on Jun. 14, 2010, now Pat. No. 8,393,641.

(51) Int. Cl.
*C06D 5/00* (2006.01)

(52) U.S. Cl.
CPC .......................................... *C06D 5/00* (2013.01)

(58) Field of Classification Search
CPC ................................................... B60R 21/2644
USPC .................................. 280/736, 741; 102/530
See application file for complete search history.

(56) References Cited

U.S. PATENT DOCUMENTS

| | | | | |
|---|---|---|---|---|
| 5,419,578 | A * | 5/1995 | Storey et al. | 280/741 |
| 5,590,905 | A * | 1/1997 | Cuevas | 280/737 |
| 5,779,268 | A * | 7/1998 | Smith et al. | 280/741 |
| 5,829,785 | A * | 11/1998 | Jordan et al. | 280/741 |
| 6,044,557 | A * | 4/2000 | Smith et al. | 29/897.2 |
| 6,257,617 | B1 * | 7/2001 | McFarland et al. | 280/736 |
| 6,412,815 | B1 * | 7/2002 | Nakashima et al. | 280/736 |
| 6,447,007 | B1 * | 9/2002 | DiGiacomo et al. | 280/741 |
| 6,460,883 | B1 * | 10/2002 | Nakashima et al. | 280/736 |
| 6,540,256 | B2 * | 4/2003 | Iwai et al. | 280/736 |
| 6,651,565 | B1 * | 11/2003 | Yamato et al. | 102/531 |
| 6,722,694 | B1 * | 4/2004 | Nakashima et al. | 280/736 |
| 6,820,556 | B1 * | 11/2004 | Oda | 102/202.7 |
| 6,854,760 | B2 * | 2/2005 | Whited et al. | 280/732 |
| 7,140,638 | B2 * | 11/2006 | Falkowski et al. | 280/736 |
| 7,237,796 | B2 * | 7/2007 | Barker et al. | 280/728.2 |
| 7,347,448 | B2 * | 3/2008 | Smith et al. | 280/736 |
| 7,401,810 | B2 * | 7/2008 | Brisighella et al. | 280/741 |
| 7,744,124 | B2 * | 6/2010 | Yamazaki | 280/736 |
| 8,083,256 | B2 * | 12/2011 | Yamazaki | 280/736 |
| 8,333,154 | B2 * | 12/2012 | Fukuyama et al. | 102/530 |
| 8,375,862 | B2 * | 2/2013 | Morgan et al. | 102/530 |
| 8,393,641 | B1 | 3/2013 | Quioc | 280/741 |
| 8,424,909 | B2 * | 4/2013 | Kobayashi et al. | 280/741 |
| 2002/0017778 | A1 * | 2/2002 | Katsuda et al. | 280/741 |
| 2002/0109339 | A1 * | 8/2002 | Al-Amin | 280/736 |
| 2002/0145275 | A1 * | 10/2002 | Hosey et al. | 280/741 |
| 2005/0140123 | A1 * | 6/2005 | Hotta et al. | 280/730.1 |
| 2005/0230948 | A1 * | 10/2005 | Al-Amin et al. | 280/736 |
| 2007/0170708 | A1 * | 7/2007 | Iwai et al. | 280/736 |
| 2009/0020197 | A1 * | 1/2009 | Hosey | 149/22 |
| 2011/0088583 | A1 * | 4/2011 | Morgan et al. | 102/530 |
| 2011/0169254 | A1 * | 7/2011 | Bert | 280/741 |
| 2013/0305952 | A1 * | 11/2013 | Fukumoto et al. | 102/530 |

* cited by examiner

*Primary Examiner* — Nicole Verley
(74) *Attorney, Agent, or Firm* — L.C. Begin & Associates, PLLC.

(57) ABSTRACT

A gas generator contains a housing containing an end closure assembly. An annular end closure is fixed within an annular igniter retainer thereby forming an annular wall for retention of an associated igniter. A first base portion of the annular end closure, and a second base portion of the annular igniter retainer are fixed together, by projection-welding for example, thereby facilitating a cost-effective seal about the igniter when assembled therewith.

7 Claims, 3 Drawing Sheets

GAS GENERATOR

CROSS REFERENCE TO RELATED APPLICATIONS

This application is a continuation-in-part of U.S. application Ser. No. 12/802,839, filed on Jun. 14, 2010, which claims the benefit of U.S. Provisional Application Ser. No. 61/268,423, filed on Jun. 12, 2009. These prior applications are incorporated herein by reference.

BACKGROUND OF THE INVENTION

The present invention relates to gas generating systems and, more particularly, to end closure assemblies and elements thereof usable for closing and/or sealing a housing of a gas generating system, such as an inflator or gas generator.

When manufacturing an inflator or gas generator, an igniter or initiator is typically sealed to the gas generator by machining a body bore seal, and structurally welding the body bore seal to the base of the associated inflator. The igniter is then subsequently sealed within the inflator by forming a sealing interface with the body bore seal. The process is not only relatively expensive, but is time-consuming as well.

When manufacturing an inflator or gas generator, yet another consideration is the strength and robustness of the housing or pressure vessel. Oftentimes, special considerations must be taken to fortify the structural design of the pressure vessel, increasing the manufacturing complexity and cost of the inflator.

SUMMARY OF THE INVENTION

In one aspect of the embodiments of the present invention, an end closure sub-assembly for an inflator is provided. The sub-assembly includes an end closure and a retainer directly attached to the end closure. The end closure includes an end closure base portion and a first wall extending from the base portion to define an end closure initiator receiving portion. The retainer includes a flat retainer base portion and a wall extending from the retainer base portion to define a retainer initiator receiving portion. The end closure initiator receiving portion and the retainer initiator receiving portion define a cavity therebetween, wherein the cavity does not include an initiator positioned therein.

In another aspect of the embodiments of the present invention, an end closure sub-assembly for an inflator is provided. The sub-assembly includes an end closure and a retainer attached to the end closure. The end closure includes an end closure base portion and a wall extending from the base portion to define an end closure initiator receiving portion. The retainer includes a flat retainer base portion and a first retainer wall extending from the retainer base portion to define a retainer initiator receiving portion. The end closure initiator receiving portion and the retainer initiator receiving portion combine to define a cavity therebetween, the cavity being structured to enable insertion of an initiator therein after attachment of the retainer to the end closure.

In another aspect of the embodiments of the present invention, a method of manufacturing an inflator is provided, comprising steps of: providing a retainer having a wall defining a retainer initiator receiving portion; providing an end closure having a wall defining an end closure initiator receiving portion structured for insertion into the retainer initiator receiving portion; inserting the end closure initiator receiving portion into the retainer initiator receiving portion to form a cavity defined by a portion of the retainer wall and a portion of the end closure wall; securing, after inserting the end closure initiator receiving portion into the retainer initiator receiving portion, the retainer to the end closure; inserting, after securing the retainer to the end closure, an initiator into the cavity; and securing the initiator in the cavity.

In another aspect of the embodiments of the present invention, a cap sub-assembly for an inflator is provided. The sub-assembly includes a cap having a base portion with a flat portion and a wall extending from a perimeter of the base portion, and a filter retainer including a base portion having a flat portion and a wall extending from a perimeter of the base portion. The cap base portion has a flat portion. The flat retainer base portion is welded to the flat portion of the cap base portion such that the flat retainer base portion inhibits deflection of the flat cap base portion.

In another aspect of the embodiments of the present invention, an inflator is provided. The inflator includes an end closure and a cap coupled to the end closure so as to form a gas-tight seal therebetween. A initiator retainer is directly attached to the end closure such that the initiator retainer inhibits deflection of the portion of the end closure attached thereto. A filter retainer is directly attached to the cap such that the filter retainer inhibits deflection of the portion of the cap attached thereto.

DETAILED DESCRIPTION

When portions of the end closure, cap, filter retainer and initiator retainer 14 are described herein as being "flat", it is understood that the flat portions of these surfaces are predominantly flat with the exception of features such as localized bumps, indentations, or other features formed in the surfaces to facilitate resistance or projection welding or other attachment methods suitable for the functions and applications described herein.

For the purposes described herein, elements of the inflator embodiments described herein are directly attached to each other when there is a direct connection (such as a weld, brazed connection, etc.) between the elements which joins the elements so that they move as a single part.

Figure 1:
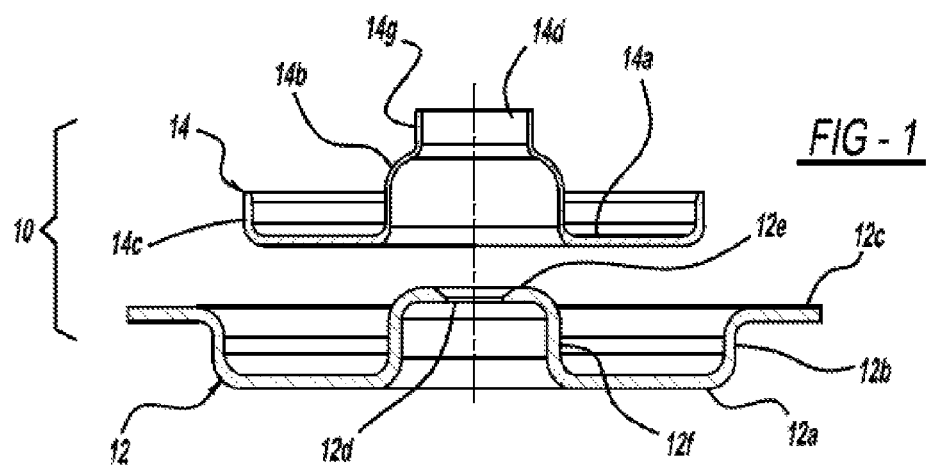
FIG. 1 is an exploded view of an end closure sub-assembly in accordance with an embodiment of the present invention.
Figure 2:
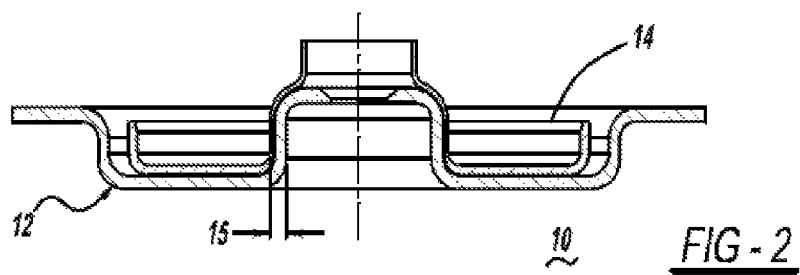
FIG. 2 is an assembled view of the end closure sub-assembly shown in FIG. 1.
Figure 3:
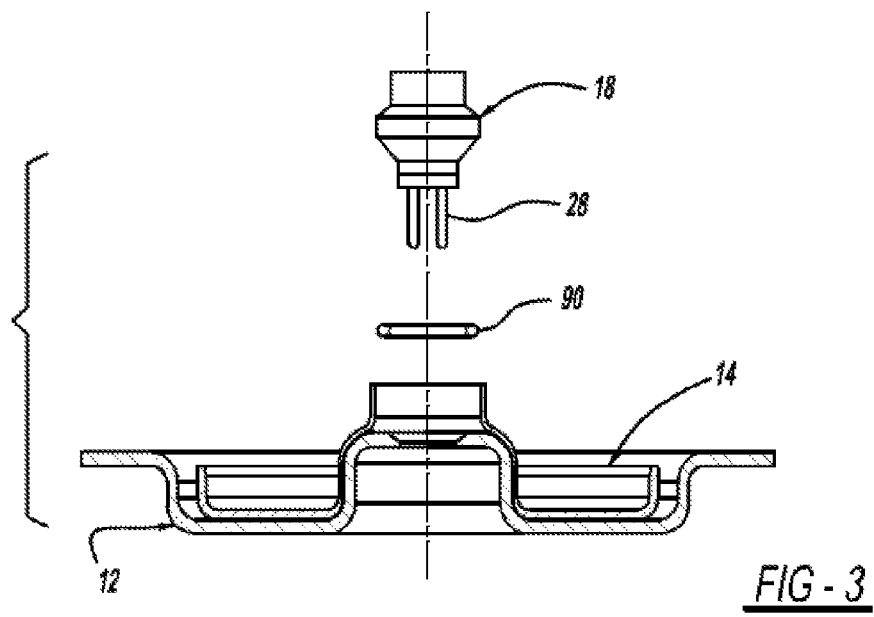
FIG. 3 is an exploded view of another end closure sub-assembly in accordance with an embodiment of the present invention, incorporating the sub-assembly shown in FIG. 2.

FIG. 1 is an exploded view of an end closure sub-assembly 10 in accordance with an embodiment of the present invention. FIG. 2 is an assembled view of the end closure sub-assembly shown in FIG. 1. Sub-assembly 10 includes an end closure 12 configured for attachment to a housing 52 (see FIG. 5) of a gas generating system for closing and/or sealing the housing, and an initiator retainer 14 attached to end closure 12.

In the embodiment shown in FIGS. 1 & 2, end closure 12 has a first base portion 12a and a first wall 12b extending along a periphery of the first base portion 12a. In the particular embodiment shown in FIGS. 1 & 2, a flange 12c extends outwardly from wall 12b. In other embodiments, flange 12c is not included. End closure base portion 12a includes an opening 12d for receiving a portion of an associated initiator 18 therein. Base portion 12a may alternatively include multiple openings 12d for receiving multiple associated initiators therein; it will be appreciated that the openings 14d in the second base portion 14a (described below) will correspond to the number of openings 12d.

Figure 5:
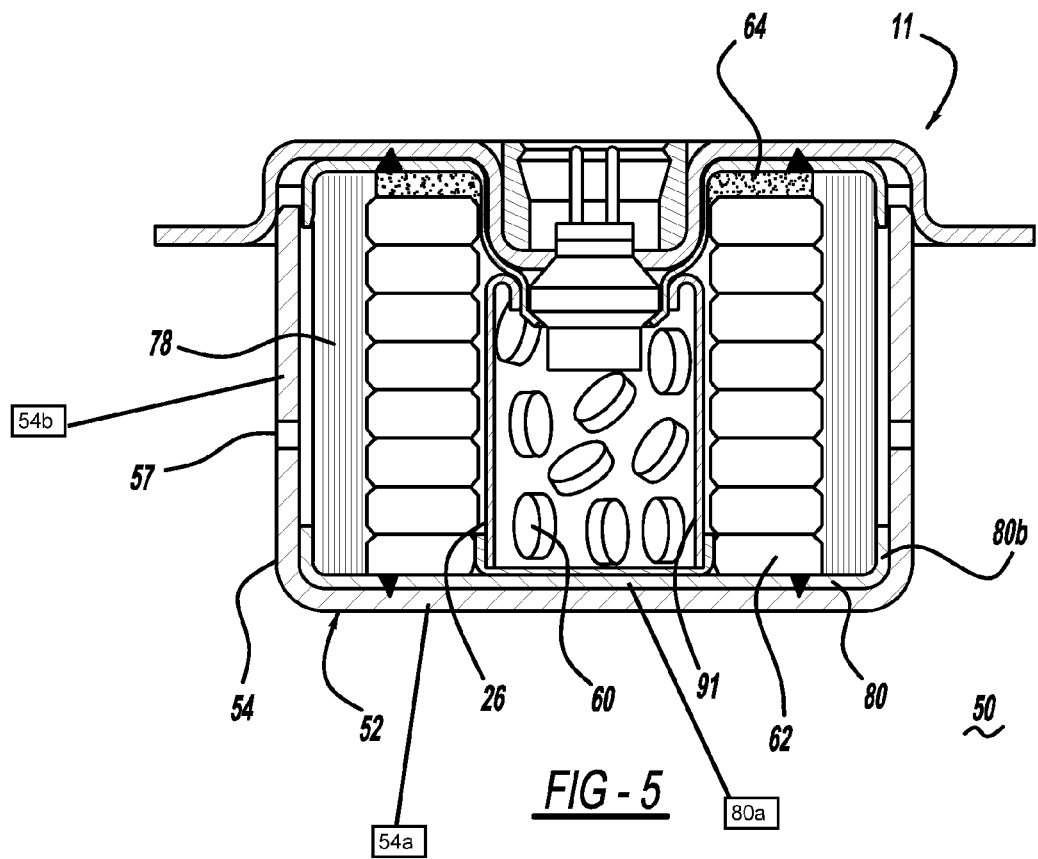
FIG. 5 is a cross-sectional side view of an exemplary gas generating system incorporating the end closure assembly shown in FIG. 4.

In the particular embodiment shown in FIGS. 1 & 2, opening 12d is provided in an initiator-receiving portion 12e of base portion 12a. Initiator-receiving portion 12e is connected to base portion 12a by a wall 12f and extends from base portion 12a in a direction toward an interior of the gas generating system when the end closure is attached to the system housing. This enables the terminals or contacts 28 of the initiator 18 to be recessed within the end closure as shown in FIG. 5 for protection.

In the embodiment shown, initiator-receiving portion 12e and a first annular wall 12f extend from a central portion of the end closure 12. However, any initiator-receiving portion and its associated wall may be spaced apart from the center of the end closure, depending on the design considerations and geometry of a particular gas generating system.

Initiator-receiving portion 12e may be fabricated using any suitable technique, depending on such factors as the materials from which the end closure is formed, the shape of the initiator-receiving portion, and other requirements of a particular application. In one embodiment, end closure 12 is formed from a metallic material and initiator-receiving portion 12e and wall 12f are drawn in the material. In another embodiment, end closure 12 is formed from a polymer material and initiator-receiving portion 12e and wall 12f are molded into the base portion 12a.

End closure 12 may be formed form any suitable material (for example, a metal, metal alloy, or polymer) suitable for the requirements of a particular application.

Referring again to FIGS. 1 & 2, initiator retainer 14 has a base portion 14a including a formed portion or second annular wall 14b extending in a direction toward an interior of the gas generating system when the end closure is attached to the system housing. Formed portion 14b defines an opening 14d configured for receiving a portion of initiator 18 therein. As shown in FIGS. 1 & 2, when retainer 14 is joined to end closure 12, the second annular wall 14b is joined in nested relationship over first annular wall 12f, respectively. Stated another way, as shown in the embodiment of FIGS. 1 & 2, the shape of metallic initiator retainer 14 substantially conforms to the shape of metallic end closure 12, thereby facilitating nested relationship of retainer 14 over end closure 12. When joined in this manner, the juxtaposed annular walls 14b and 12f form an annular wall 15 for containment, seating, and sealing of an initiator 18, as described below. However, in alternative embodiments, the initiator retainer 14 may have any shape suitable for the requirements of a particular application.

Embodiments of the initiator retainer 14 include features which facilitate attachment of the initiator retainer 14 to the end closure 12 such that the initiator retainer inhibits deflection of the end closure responsive to an increase in internal pressure within the inflator housing. In the examples shown in FIGS. 1 & 2, retainer 14 is secured to end closure 12 by projection welding together (or otherwise suitably attaching) abutting sections of their respective base portions 14a and 12a. More specifically, in the examples shown in FIGS. 1 & 2, at least a portion the end closure base portion 12a is flat, at least a portion of the initiator retainer base portion 14a is flat, and the flat portions of the initiator retainer and end closure base portions are welded together, such that the flat retainer base portion inhibits deflection of the flat end closure base portion.

In one embodiment, the overall wall thickness of the housing may be substantially reduced by 35 to 40% of its original thickness, by virtue of the reinforced area of the welded base portions 12a and 14a. For example, it has been found in one embodiment that the wall thickness may be reduced from a typical thickness of about 2.2 millimeters to about 1.4 millimeters. As a result, the pressure vessel strength is substantially enhanced, by essentially doubling the base material thickness, while minimizing the overall housing thickness required. Other base and housing thicknesses may be iteratively determined, depending on the type of inflator, and depending on the ignition and gas generation chemistry employed. Other modes of attachment are also contemplated depending on the geometries of the end closure 12 and the initiator retainer 14, and other design, materials, and operational factors.

In one embodiment, shown in FIGS. 1 & 2, initiator retainer 14 is made from a metallic material and formed portion or second annular wall 14b is fabricated by drawing a portion of the initiator retainer material in the direction shown. However, it will be realized that alternative configurations suitable for receiving the initiator 18 therein may be utilized, and that other suitable fabrication methods may be used to produce such alternative configurations. In addition, retainer 14 can be made from any other suitable material (for example, a polymer).

In the embodiment shown, formed portion or second annular wall 14b is provided in a central portion of the initiator retainer 14. However, any formed portion(s) 14b of the initiator retainer may alternatively be spaced apart from the center of the initiator retainer, depending on the design considerations and geometry of a particular gas generating system.

Formed portion or second annular wall 14b may be stepped as shown in FIGS. 1 & 2 to meet processing requirements of the initiator retainer material (for example, in the case of a metallic retainer), to facilitate recessed mounting of the initiator as shown in FIG. 5, or to meet other design requirements of a particular gas generating system.

In the embodiment shown in FIGS. 1&2, a wall 14c extends along a periphery of the base portion 14a, for engaging or helping to contain another element of the gas generating system. However, in alternative embodiments, wall 14c may be omitted if desired.

Initiator retainer 14 may be formed from any suitable material, for example a metallic material or a polymer material. Initiator 18 may be any suitable initiator known in the art. One exemplary initiator construction is described in U.S. Pat. No. 6,009,809, incorporated herein by reference. In the embodiment shown in FIGS. 1-4, a third annular wall 14g contiguous with formed portion or second annular wall 14b is structured to enable crimping of the wall 14g over a portion of initiator 18, to retain the initiator in the retainer 14. Other methods (for example, press-fitting or adhesive application) of securing the initiator to the retainer are also contemplated.

If desired, a resilient seal 90 (such as an o-ring seal) or other type of seal may be positioned between the initiator 18 and the retainer 14 to prevent the escape of generated gases through the initiator-retainer interface.

Figure 4:
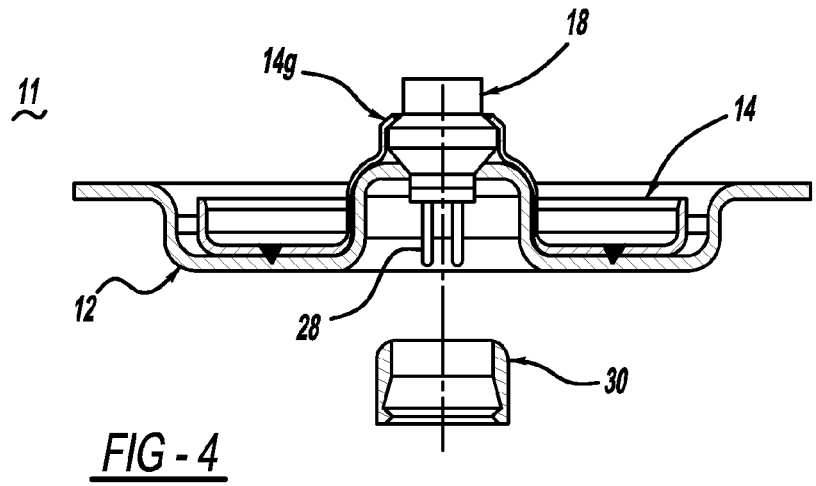
FIG. 4 is an exploded view of an end closure assembly in accordance with an embodiment of the present invention, incorporating the sub-assembly shown in FIG. 3.

Referring to FIG. 4, if desired, a connector retainer 30 may be incorporated into the end closure assembly for retaining a connector (not shown) coupled to the initiator terminals 28 when the gas generating system is installed in a vehicle or other device. The connector operatively couples the initiator 18 to a device or mechanism for actuating the initiator when the need for generated gases arises.

Referring now to FIG. 5, an end closure assembly 11 as shown in FIG. 4 is shown incorporated into a gas generating system 50. System 50 has a housing 52, wherein the housing 52 is formed from a first housing portion or cap 54 and an end closure assembly or base 11 secured to the first housing portion 54, so as to form a substantially hermetic seal between the first housing portion 54 and the end closure assembly 11. Housing 52 has one or more gas exit apertures 57 formed therein to enable fluid communication between an interior of the housing and an exterior of the housing upon activation of the gas generating system.

A tube 26 may be positioned within the gas generating system to enclose a portion of initiator 18 and for receiving a booster material 60 in an interior thereof. Tube 26 is generally cylindrical and may be secured within housing 52 by welding or any other suitable method. Tube 26 has at least one opening 91 formed therein to enable fluid communication between the interior of the tube and an exterior of the tube upon activation of the gas generating system. Tube 26 may be extruded, roll formed, or otherwise metal formed and may be made from carbon steel, stainless steel, or any other suitable material. In a particular embodiment, tube 26 is formed from a thermally-conductive material to facilitate heat transfer between a heat-activated auto-ignition material (not shown) and a portion of the gas generating system housing in thermal contact with tube 26 and exposed to elevated temperatures occurring on the exterior of the housing, due to a fire for example. Ignition of the auto-ignition material produces ignition of booster material 60 or gas generant material in thermal communication with the auto-ignition material, in a manner known in the art.

A plurality of annular gas generant wafers 62 are stacked around and adjacent tube 26. In the embodiment shown in the drawings, wafers 62 are annular in shape and each wafer 62 has substantially the same dimensions. However, the wafers may have any of a variety of alternative shapes positionable within housing 52. In addition, other, alternative forms of gas generant (for example, tablets) may be used. Examples of gas generant compositions suitable for use in the embodiments of the present invention are disclosed in U.S. Pat. Nos. 5,035,757, 6,210,505, and 5,872,329, incorporated herein by reference. However, the range of suitable gas generants is not limited to that described in the cited patents.

Referring again to FIG. 5, appropriately shaped pads or cushions 64 may be provided at one or more ends of the stack of gas generant wafers 62 for holding the gas generant wafers in place and/or for cushioning the gas generant wafers against vibration and impact. Cushions 64 may be formed from a ceramic fiber material, for example.

Booster material 60 may be positioned in tube 26 to facilitate combustion of gas generant 62. Activation of initiator 18 produces combustion of the booster material, thereby effecting ignition of gas generant material 62 in a manner known in the art.

A quantity of a known heat-activated auto-ignition material (not shown) may be positioned within the gas generating system so as to enable fluid communication between the auto-ignition material and any associated gas generant material and/or any associated booster material upon activation of the gas generating system. The auto-ignition material is a pyrotechnic material which is ignited by exposure to a temperature lower than the ignition temperature of the associated gas generant. As is known in the art, the auto-ignition material is ignited by heat transmitted from an exterior of the system housing to the interior of the housing due to an elevated external temperature condition (produced, for example, by a fire). Combustion of the auto-ignition material results in combustion of the associated gas generant, either directly or through intervening combustion of the booster material. Suitable auto ignition materials are known to those skilled in the art. Examples of suitable auto-ignition materials are nitrocellulose based compositions and gun powder.

FIG. 5 shows a cap sub-assembly in accordance with an embodiment of the present invention, including a cap 54 and a filter retainer 80 positioned in and attached to the cap. Referring to FIG. 5, a filter retainer 80 has a base portion 80a including a formed portion or second annular wall 80b extending in a direction toward an interior of the gas generating system when the cap 54 is attached to the base assembly 11. Embodiments of the filter retainer 80 and/or the cap 54 include features which facilitate attachment of the filter retainer to the cap 54 such that the filter retainer inhibits deflection of the cap responsive to an increase in internal pressure within the inflator housing. In the example shown in FIG. 5, filter retainer 80 is secured to cap 54 by projection welding together (or otherwise suitably attaching) abutting sections of their respective base portions 54a and 80a, in a manner similar to the attachment of initiator retainer 14 to end closure 12 as previously described. More specifically, in the example shown in FIG. 5, at least a portion the cap base portion 54a is flat, at least a portion of the filter retainer base portion 80a is flat, and the flat portions of the filter retainer and cap base portions are welded together, such that the flat retainer base portion inhibits deflection of the flat cap base portion.

In one embodiment, the overall wall thickness of the housing along cap base portion 54a may be reduced by 35 to 40% of its original thickness, due to the structural reinforcement provided by welding filter retainer base portion 80a to cap base portion 54a. For example, it has been found in one embodiment that the wall thickness of cap base portion 54a may be reduced from a typical thickness of about 2.2 millimeters to about 1.4 millimeters. As a result, the strength of the housing as a pressure vessel is substantially enhanced, by essentially doubling the thickness of the housing along the cap base portion 54a, while minimizing the required thickness of the cap base portion itself. Alternative required base portion and housing thicknesses may be iteratively determined, depending on the type of inflator, and depending on the ignition and gas generation chemistry employed. Methods of attaching the filter retainer base portion 80a to the cap base portion 54a other than welding are also contemplated depending on the geometries of the filter retainer and cap, and other design, materials, and operational factors. Filter retainer 80 may be formed from a metallic material or from any other suitable material.

In the embodiment shown in FIG. 5, filter retainer wall 80b extends along a periphery of the base portion 80a, for engaging or helping to position and/or contain another element of the gas generating system (in this case, filter 78). However, in alternative embodiments, wall 80b may be omitted if desired.

A filter 78 may be incorporated into the inflator design for filtering particulates from gases generated by combustion of gas generant material 62. In general, filter 78 is positioned between any gas generant material in the housing and any gas exit apertures 57 formed in housing 52. In the embodiment shown in the drawings, filter 78 is positioned between initiator retainer wall 14c and a similar wall 80b formed along a periphery of a filter retainer 80 and aligned with wall 14c. Filter retainer 80 is secured within housing 52 using any suitable method. The filter may be formed from one of a variety of materials (for example, a carbon fiber mesh or sheet) known in the art for filtering gas generant combustion products.

In operation, the gas generant material 62 is ignited by activation of first initiator assembly 18 and the resulting ignition of booster material 60. Gases resulting from the combustion of the gas generant flow through filter 78, exiting the gas generating system through gas exit openings 57.

In yet another aspect of the invention, and as inherently shown in the Figures, a method of manufacturing an inflator, or more specifically, a method of sealing a gas generant igniter within an inflator, is described by the following steps:
1. Providing an annular end closure plate 12 having a predetermined first annular wall shape;
2. Providing an annular igniter retainer 14 having a second annular wall shape substantially congruent to and conforming to the shape of the annular end closure plate 12;
3. Overlaying the end closure plate 12 with the annular igniter retainer 14 to juxtapose the second annular wall shape and the first annular wall shape;
4. Welding or otherwise fixing the annular igniter retainer to the end closure plate;
5. Providing an annular seal for seating within the second annular wall shape;
6. Inserting an igniter through the juxtaposed first and second annular walls; And
7. Crimping or otherwise sealing the igniter within the annular igniter retainer.

It will be appreciated that the inflator is otherwise manufactured as known in the art and may for example, incorporate known gas generant, booster, and ignition compositions. Other structural features of the inflator may be made as known to one of ordinary skill in the art.

It will be appreciated that inflators or gas generators manufactured in accordance with the present invention enjoy at least one or more of the following benefits. The present method of sealing an igniter within a gas generator, inherent within the end closure assembly described 11 herein, provides a relatively low-cost method of sealing the inflator. Furthermore, the relatively-expensive body bore seal is eliminated as is the relatively expensive and time-consuming structural weld necessitated when employing the body bore seal. The present end closure assembly 11 may be adapted to various initiator and connector retainers, and therefore presents a broad solution to many types of inflators. Additionally, the present end closure assembly presents a relatively strong pressure vessel given the increased relative thickness of the base, a doubling of the base wall thickness for example.

Figure 6:
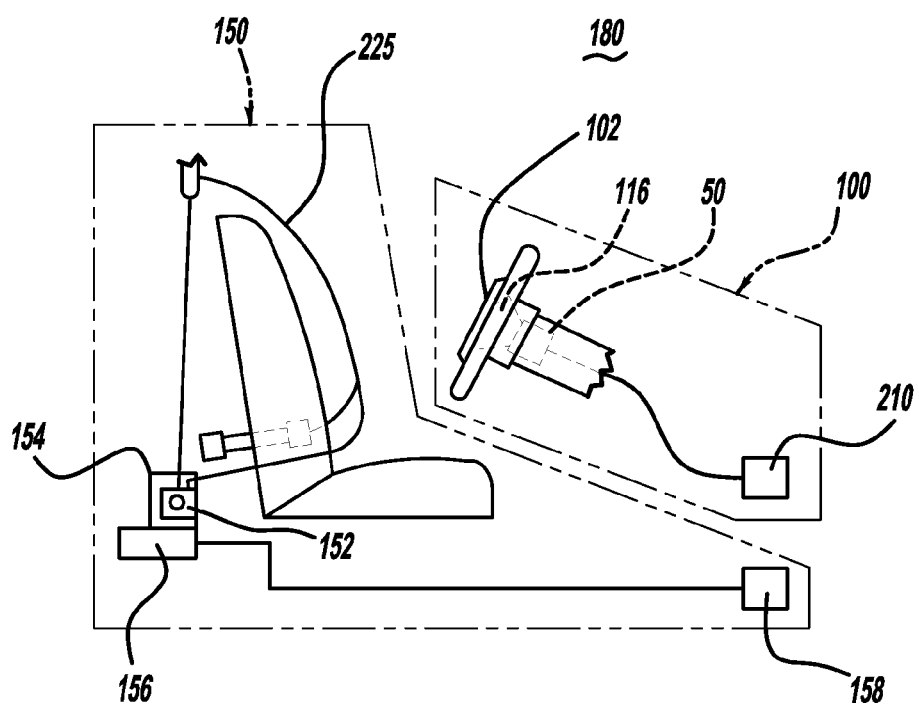
FIG. 6 is a schematic view of an airbag system and a vehicle occupant protection system incorporating a gas generating system including an end closure assembly in accordance with an embodiment of the present invention.

Referring to FIG. 6, in a particular application, an embodiment of a gas generating system 50 incorporating the features described above is incorporated into an airbag system 100. Airbag system 100 comprises a housing 102 having a rupturable frontal closure 114 (not shown), an airbag 116, and a gas generating system 50 in accordance with an embodiment of the present invention. Airbag system 100 may include (or be in communication with) a crash event sensor 210 (for example, an inertia sensor or an accelerometer) including a known crash sensor algorithm that signals actuation of initiator 18 previously described.

Referring again to FIG. 6, any embodiment of a gas generating system 50 incorporating the features described above (or an airbag system including such a gas generating system) may be incorporated into a broader, more comprehensive vehicle occupant protection system 180 including additional elements such as, for example, a safety belt assembly 150. FIG. 6 shows a schematic diagram of one exemplary embodiment of such a protection system.

Safety belt assembly 150 includes a safety belt housing 152 and a safety belt 225 in accordance with the present invention extending from housing 152. A safety belt retractor mechanism 154 (for example, a spring-loaded mechanism) may be coupled to an end portion of the belt. In addition, a safety belt pretensioner 156 may be coupled to belt refractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, each incorporated herein by reference.

Safety belt system 150 may include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing descriptions of various embodiments of the present invention is for illustrative purposes only. As such, the various structural and operational features herein disclosed are susceptible to a number of modifications, none of which departs from the scope of the present invention as defined in the appended claims.

What is claimed is:

1. An end closure sub-assembly for an inflator, the sub-assembly comprising:
   an end closure and a retainer directly attached to the end closure,
   the end closure including an end closure base portion and a first wall extending from the base portion to define an end closure initiator receiving portion,
   the retainer including a flat retainer base portion and a wall extending from the retainer base portion to define a retainer initiator receiving portion,
   the end closure initiator receiving portion and the retainer wall defining a cavity therebetween, wherein the cavity does not include an initiator positioned therein, and wherein the end closure initiator receiving portion extends transversely of the retainer wall and forms a support surface structured to prevent passage of an initiator from a first side of the receiving portion through the receiving portion, to a second side of the receiving portion opposite the first side.

2. A gas generating system comprising an end closure sub-assembly in accordance with claim 1.

3. The gas generating system of claim 2 wherein the end closure further comprises a second end closure wall extending from the end closure base portion and spaced apart from the first end closure wall, and wherein the first end closure wall, the retainer base portion, and the second end closure wall combine to define a cavity therebetween, the cavity being structured for receiving therein another element of the gas generating system.

4. The gas generating system of claim 1 wherein the support surface and the retainer wall are structured to be in direct contact with an initiator secured in the cavity.

5. The end closure sub-assembly of claim 1 wherein the retainer base portion and the end closure base portion are directly attached to each other.

6. The end closure sub-assembly of claim 1 wherein the retainer further comprises an outer wall extending from an outer edge of the base portion, and wherein the first retainer wall, outer wall and base portion combine to define a cavity therebetween.

7. The sub-assembly of claim 1 wherein the end closure base portion has a flat portion, and wherein the flat retainer base portion is welded to the flat portion of the end closure base portion such that the flat retainer base portion inhibits deflection of the flat end closure base portion.

* * * * *